United States Patent
Barmore et al.

(10) Patent No.: US 7,368,153 B2
(45) Date of Patent: *May 6, 2008

(54) OXYGEN DETECTION SYSTEM FOR A RIGID CONTAINER

(75) Inventors: Charles R. Barmore, Moore, SC (US); Drew V. Speer, Simpsonville, SC (US); Thomas D. Kennedy, Simpsonville, SC (US); Marvin R. Havens, Greer, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/719,625

(22) Filed: Nov. 21, 2003

(65) Prior Publication Data

US 2004/0131806 A1  Jul. 8, 2004

Related U.S. Application Data

(60) Provisional application No. 60/431,475, filed on Dec. 6, 2002.

(51) Int. Cl.
*B29D 22/00* (2006.01)
*B29D 23/00* (2006.01)
*B32B 1/08* (2006.01)

(52) U.S. Cl. .................. 428/36.7; 428/35.7; 428/36.6; 426/232; 436/138; 422/87

(58) Field of Classification Search ............... 428/35.7, 428/36.7, 36.6; 426/232; 436/136, 138, 436/1; 422/56, 57, 58, 61, 87
See application file for complete search history.

(56) References Cited

U.S. PATENT DOCUMENTS

| 4,285,697 | A | 8/1981 | Neary |
| 4,526,752 | A | 7/1985 | Perlman et al. |
| 4,772,560 | A | 9/1988 | Attar |
| 4,810,655 | A | 3/1989 | Khalil et al. |
| 4,820,606 | A | 4/1989 | Miyasaka et al. |
| 4,840,919 | A | 6/1989 | Attar |

(Continued)

FOREIGN PATENT DOCUMENTS

EP  1 598 667  11/2005

(Continued)

OTHER PUBLICATIONS

Japanese Patent Abstract No. JP 2003335380 (Otsuka Seiyaku).

(Continued)

*Primary Examiner*—Michael Miggins
(74) *Attorney, Agent, or Firm*—Mark B. Quatt

(57) ABSTRACT

The present invention relates to the non-invasive use of a luminescent compound to detect and measure concentrations of oxygen dissolved in a rigid container, especially a bottle, a tray, a carton, a lidstock associated with a tray, a stand up pouch, or a paperboard container. The measurement is made independent of the oxygen concentration of the surrounding atmosphere. The invention is especially useful as a quality assurance check to verify oxygen scavenger activation during the assembly of bottled products, and modified atmosphere and vacuum packages. The method according to the invention is faster and less wasteful than previous methods that rely on measuring oxygen concentration within the headspace of an assembled package.

4 Claims, 9 Drawing Sheets

U.S. PATENT DOCUMENTS

| | | |
|---|---|---|
| 5,043,286 A | 8/1991 | Khalil et al. |
| 5,096,813 A | 3/1992 | Krumhar et al. |
| 5,108,932 A | 4/1992 | Wolfbeis |
| 5,110,530 A | 5/1992 | Havens |
| 5,114,676 A | 5/1992 | Leiner et al. |
| 5,211,875 A | 5/1993 | Speer et al. |
| 5,298,310 A | 3/1994 | Havens |
| 5,310,497 A | 5/1994 | Ve Speer et al. |
| 5,316,949 A | 5/1994 | Bull et al. |
| 5,350,622 A | 9/1994 | Speer et al. |
| 5,358,876 A | 10/1994 | Inoue et al. |
| 5,407,829 A | 4/1995 | Wolfbeis et al. |
| 5,439,648 A | 8/1995 | Balderson et al. |
| 5,458,896 A | 10/1995 | Porter |
| 5,483,819 A | 1/1996 | Barmore et al. |
| 5,529,833 A | 6/1996 | Speer et al. |
| 5,583,047 A | 12/1996 | Blinka et al. |
| 5,617,812 A | 4/1997 | Balderson et al. |
| 5,686,161 A | 11/1997 | Cullen et al. |
| 5,744,246 A | 4/1998 | Ching |
| 5,849,594 A | 12/1998 | Balderson et al. |
| 5,863,460 A | 1/1999 | Slovacek et al. |
| 5,904,960 A | 5/1999 | Becraft et al. |
| 5,911,910 A | 6/1999 | Becraft et al. |
| 5,993,922 A | 11/1999 | Babrowicz et al. |
| 6,015,715 A | 1/2000 | Kirschner et al. |
| 6,139,799 A | 10/2000 | Kimball et al. |
| 6,190,612 B1 | 2/2001 | Berger et al. |
| 6,233,907 B1 | 5/2001 | Cook, Jr. et al. |
| 6,287,481 B1 | 9/2001 | Luthra et al. |
| 6,297,508 B1 | 10/2001 | Barmore et al. |
| 6,680,094 B2 | 1/2004 | Kikuchi et al. |
| 6,794,191 B2 | 9/2004 | Putnam et al. |
| 2003/0008400 A1 | 1/2003 | Putnam et al. |
| 2003/0040564 A1 | 2/2003 | Tung et al. |
| 2003/0108702 A1 | 6/2003 | Tung et al. |
| 2003/0151025 A1 | 8/2003 | Yang et al. |

FOREIGN PATENT DOCUMENTS

| | | |
|---|---|---|
| GB | 2 132 348 B | 5/1987 |
| JP | 2003034001 A | 2/2003 |
| WO | WO 98/05703 | 2/1998 |
| WO | WO 01/63264 A1 | 8/2001 |
| WO | WO 01/69243 A1 | 9/2001 |
| WO | WO 02/49923 A2 | 6/2002 |
| WO | WO 02/051705 A2 | 7/2002 |
| WO | WO 02/099416 A1 | 12/2002 |

OTHER PUBLICATIONS

Japanese Patent Abstract No. JP 2003335380 (Otsuka Seiyaku), date unknown.

"A Novel Solid-State Oxygen Sensor", *Johns Hopkins APL Technical Digest*, vol. 17, No. 4 (1996), pp. 377-385.

"Effects of Polymer Matrices on the Time-Resolved Luminescence of a Ruthenium Complex Quenched by Oxygen", *Journal of Physical Chemistry*, 1995, 99, pp. 3162-3167.

"Photophysics and Photochemistry of Oxygen Sensors Based on Luminescent Transition-Metal Complexes", *Analytical Chemistry* 1991, vol. 63, pp. 337-342.

"Determination of Oxygen Concentrations by Luminescence Quenching of a Polymer-Immobilized Transition-Metal Complex", *Analytical Chemistry*, 1987, vol. 59, pp. 2780-2785.

"Monitoring—Non-invasive method for determining oxygen in food packaging", *Food, Cosmetics and Drug Packaging*, Jun. 2000, 2 pages.

English abstract of JP 2003307513A dated Oct. 31, 2003 entitled "Oxygen indicator for packaging bag, included ink applied to base, and sealant layer provided on the based through adhesive agent, such taht adhesive agent is not formed on ink portion of base", Toppan Printing Co. Ltd.

Plastics Applications/PET Bottles with Oxygen Scavenger, *Plastics Engineering*, Aug. 2003, p. 16.

Field Trip Report No. 17042, Oct. 16, 2001, 2 pages.
Field Trip Report No. 17050, Dec. 17, 2001, 5 pages.
Field Trip Report No. 17055, Jan. 3, 2002, 3 pages.
Field Trip Report No. 17056, Jan. 8, 2002, 3 pages.
Field Trip Report No. 17057, Jan. 3, 2002, 2 pages.

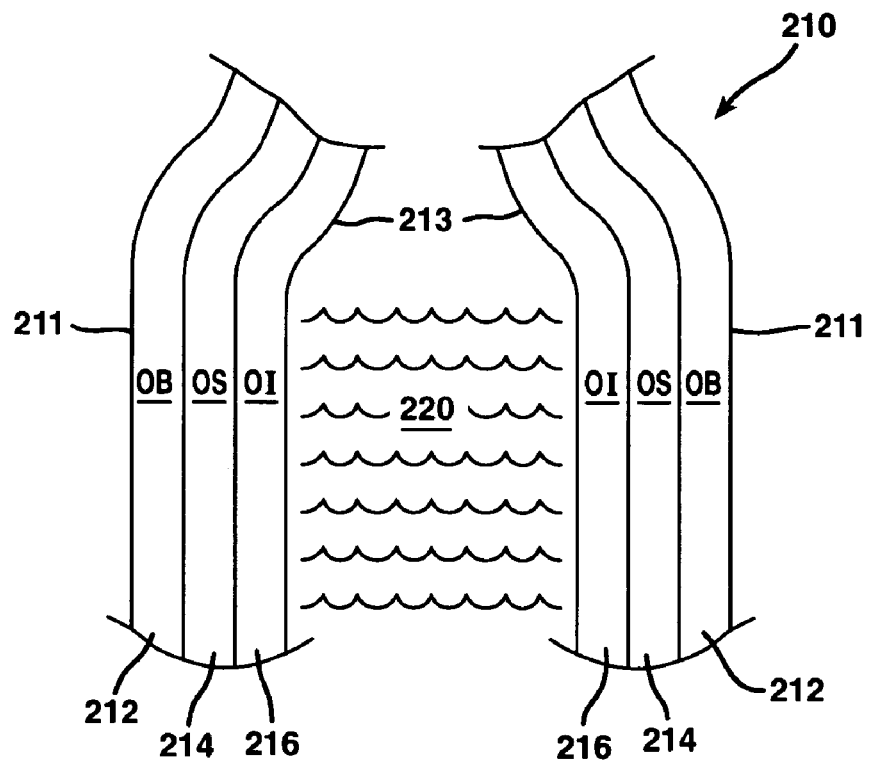
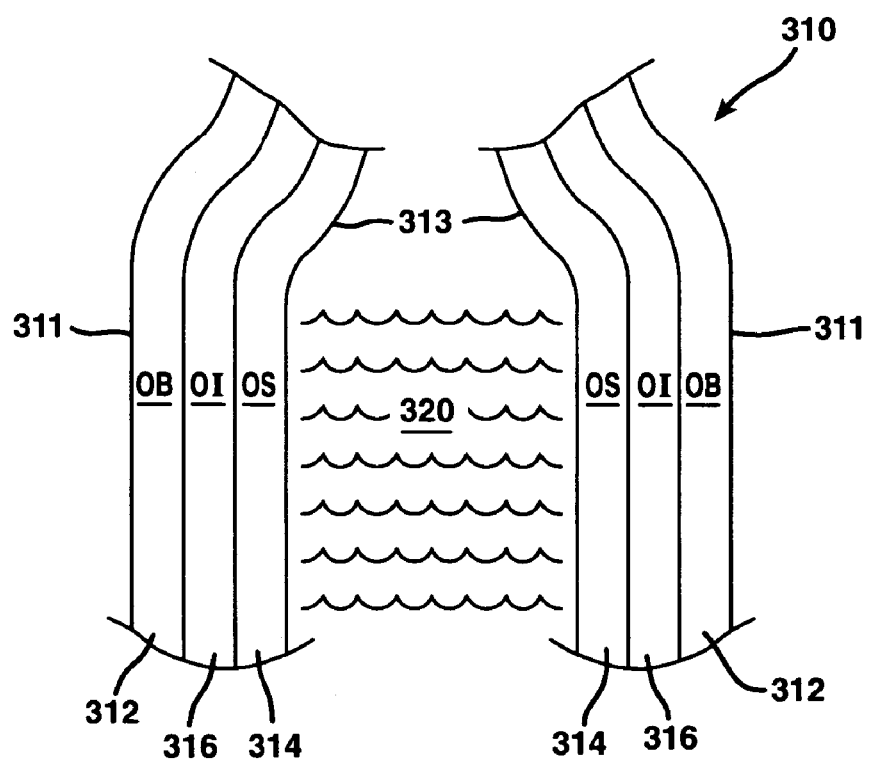

OXYGEN DETECTION SYSTEM FOR A RIGID CONTAINER

This application claims the benefit of U.S. Provisional Application No. 60/431,475, filed Dec. 6, 2002.

FIELD OF THE INVENTION

The present invention relates to a rigid solid container, such as a bottle, carton or a trayed package with lid, that includes an oxygen scavenger, and includes or is proximate to a luminescent compound that indicates the absence of oxygen dissolved in the rigid container, particularly in a polymeric container such as a bottle, tray, lid, or stand up container that can be used to package an oxygen sensitive product, such as a liquid or powder. The container and associated method is useful as a real time or very rapid quality assurance check to verify oxygen scavenger activity during package assembly.

BACKGROUND OF THE INVENTION

Oxygen spoils many products. Foods, beverages, pharmaceuticals, medical devices, corrodible metals, analytical chemicals, electronic devices, and many other products may perish or experience diminished shelf life when stored too long in the presence of oxygen. To combat this problem, manufacturers of packaging materials have developed packaging materials and systems to protect these products by providing a package environment, or."headspace", with reduced oxygen levels.

In many cases, the low oxygen level that can be obtained with these packaging systems is still insufficient to provide the desired shelf life. In these cases, packagers find it advantageous to include an oxygen scavenger within a low oxygen modified atmosphere package (MAP) or a vacuum package (VP). Packaging materials that include oxygen scavengers have grown increasingly sophisticated in recent years. For example, Speer et al. have developed clear, multi-layered packaging films that incorporate an oxygen scavenging composition within its layers. See U.S. Pat. Nos. 5,529,833, 5,350,622, and 5,310,497, the contents of which are incorporated herein by reference in their entirety. In this regard, see also Babrowicz et al. U.S. Pat. No. 5,993,922, also incorporated herein by reference.

For oxygen scavengers made from ethylenically unsaturated hydrocarbons and their functional equivalents, oxygen scavenging activity is triggered with actinic radiation, typically in the form of ultra violet (UV-C) light. For details on preferred methods for activating such oxygen scavenging compositions at point of use, see Speer et al., U.S. Pat. No. 5,211,875, Becraft et al., U.S. Pat. Nos. 5,911,910, and 5,904,960, and co-pending applications U.S. Ser. No. 09/230,594 filed Aug. 1, 1997, and Ser. No. 09/230776 filed Jul. 29, 1997, and U.S. Pat. No. 6,233,907 (Cook et al.), all of which are incorporated herein by reference in their entirety.

Unfortunately, oxygen scavengers do not always activate on command. This may result from a number of factors, including defective scavenger compositions, inadequate triggering conditions, operator error, or a combination of these or other factors. Conventional scavengers do not themselves visually indicate whether or not they are active. In response to this uncertainty, operators of packaging assembly plants prefer to verify scavenger activity as soon as possible after triggering. The longer a failed oxygen scavenger remains undiscovered, the more waste and expense is incurred, especially where packaging equipment operates at high speeds.

Prior art methods for verifying oxygen scavenger activity in a low oxygen package involve detecting oxygen concentrations in the package headspace. The measurement cannot take place until after the package has been assembled and equilibrium of oxygen levels established among the headspace, package layers, and package contents. Detection of sufficiently reduced oxygen levels within the headspace allows one to infer successful scavenger activation.

Under this approach, one typically has two options, neither of which is particularly satisfactory. One option is to leave an oxygen indicator in the package headspace after it has been assembled and sealed. For example, Mitsubishi teaches an indicator comprising glucose and methylene blue, encased within a sachet. The sachet is left inside the package after it is sealed. A color change within the sachet indicates the presence of unwanted oxygen.

This approach has several disadvantages, however. Sachets must be attached to the package to avoid their being accidentally ingested by the consumer. Some package contents require a moisture-free storage environment. Yet, in the case of the Mitsubishi glucose/methylene blue indicator, moisture may be required to produce a color change. Also, sachets potentially introduce contaminants or other substances into the package that may be incompatible with its contents or accidentally ingested. For some applications, manufacturers may not want to leave indicators in packages where consumers may misinterpret the information the indicator provides.

Another option is to use probes to measure the gas content within the headspace. One commonly used headspace gas analyzer is available from Mocon Inc. Unfortunately, probes that rely on gas chromatography and other such analytical techniques cannot measure oxygen concentration in vacuum packages, where there is substantially no atmosphere to measure. In all cases, probes require sacrificing the sampled package. They invariably require some sort of device that will penetrate the package and remove a portion of the gas within the headspace. The device inevitably leaves a hole in the package, destroying the integrity of the package.

Measuring headspace oxygen, whether by indicator or invasive probe, has an important additional disadvantage as well. It requires time, often several hours, for scavengers seated deep within the walls of MAP materials to consume enough oxygen to affect measurably the oxygen levels in the headspace. This is often further delayed and complicated by out-gassing by package contents (as occurs with foods) or by poor circulation of gasses within the package. Therefore, such methods will typically require a minimum of between 18 and 24 hours to verify scavenging activity. If there is a problem during this time, large quantities of product will have been packaged. Clearly, there remains a need in the art for a significantly faster, less wasteful container and method for verifying oxygen scavenger activity in a package, than the old method that relies on measuring oxygen concentration within the headspace of an already assembled package. The present invention provides such a container and method.

Definitions

"Rigid container" and the like herein refers to containers that can hold a product such as a food or non food product, such as a solid or liquid product, and that substantially maintain their shape when empty. These containers may nevertheless have some degree of flexibility or softness. Examples of rigid containers are PET or other types of bottles, especially those designed for the marketing of alcoholic or non alcoholic beverages, condiments, lotions, and the like; food trays such as those made from foamed or solid polystyrene, crystallized polystyrene (CPS), PET, polypropylene, or polyethylene; lidstocks associated with a tray as part of an overall package or container; paperboard cartons with liners, labels, or the like made from polymeric materials and/or metallized substrates; and stand up pouches where such pouches substantially maintain their shape when empty.

SUMMARY OF THE INVENTION

In a first aspect, a rigid container comprises an oxygen barrier having an oxygen transmission rate of no more than 100 cc/m$^2$/24 hr at 25° C., 0% RH, 1 atm (ASTM D 3985); an oxygen scavenger; and an oxygen indicator comprising a luminescent compound.

In a second aspect, a rigid container comprises an oxygen barrier layer, the oxygen barrier layer having an oxygen transmission rate of no more than 100 cc/m$^2$/24 hr at 25° C., 0% RH, 1 atm (ASTM D 3985); an oxygen scavenger layer, the oxygen scavenger layer forming the innermost layer of the rigid container; and a patch, adhered to the oxygen barrier layer, comprising an oxygen indicator comprising a luminescent compound.

In a third aspect, a rigid container consists essentially of an oxygen barrier layer, the oxygen barrier layer having an oxygen transmission rate of no more than 100 cc/m$^2$/24 hr at 25° C., 0% RH, 1 atm (ASTM D 3985); an oxygen scavenger layer; and a patch, adhered to the oxygen barrier layer, comprising an oxygen indicator comprising a luminescent compound.

In a fourth aspect, a rigid container comprises a blend of an oxygen barrier, the oxygen barrier having an oxygen transmission rate of no more than 100 cc/m$^2$/24 hr at 25° C., 0% RH, 1 atm (ASTM D 3985), and an oxygen scavenger; and a patch, adhered to the blend, comprising an oxygen indicator comprising a luminescent compound.

In a fifth aspect, a rigid container comprises a tray comprising a tray liner, and a tray flange, wherein the tray liner comprises an oxygen indicator comprising a luminescent compound; and a lidstock comprising an oxygen barrier having an oxygen transmission rate of no more than 100 cc/m$^2$/24 hr at 25° C., 0% RH, 1 atm (ASTM D 3985), and an oxygen scavenger.

In a sixth aspect, a rigid container comprises a tray comprising a tray liner, and a tray flange, wherein the tray liner comprises an oxygen indicator comprising a luminescent compound, and an oxygen scavenger; and a lidstock comprising an oxygen barrier having an oxygen transmission rate of no more than 100 cc/m$^2$/24 hr at 25° C., 0% RH, 1 atm (ASTM D 3985).

In a seventh aspect, a rigid container comprises a tray comprising a tray liner, and a tray flange, wherein the tray liner comprises an oxygen scavenger; and a patch, adhered to the tray flange, comprising an oxygen indicator comprising a luminescent compound.

In a eighth aspect, a rigid container comprises a tray comprising a tray flange, wherein the tray comprises an oxygen indicator comprising a luminescent compound; and a lidstock comprising an oxygen barrier having an oxygen transmission rate of no more than 100 cc/m$^2$/24 hr at 25° C., 0% RH, 1 atm (ASTM D 3985), and an oxygen scavenger.

BRIEF DESCRIPTION OF THE DRAWINGS

The accompanying drawings illustrate several embodiments of the invention:

FIG. 3 is a fragmentary, cross-sectional view of a bottle, like that of FIG. 1, but without the second oxygen barrier component;

FIG. 4 is a fragmentary, cross-sectional view of a bottle, like that of FIG. 2, but without the second oxygen barrier component;

DETAILED DESCRIPTION OF THE INVENTION

Figure 1:
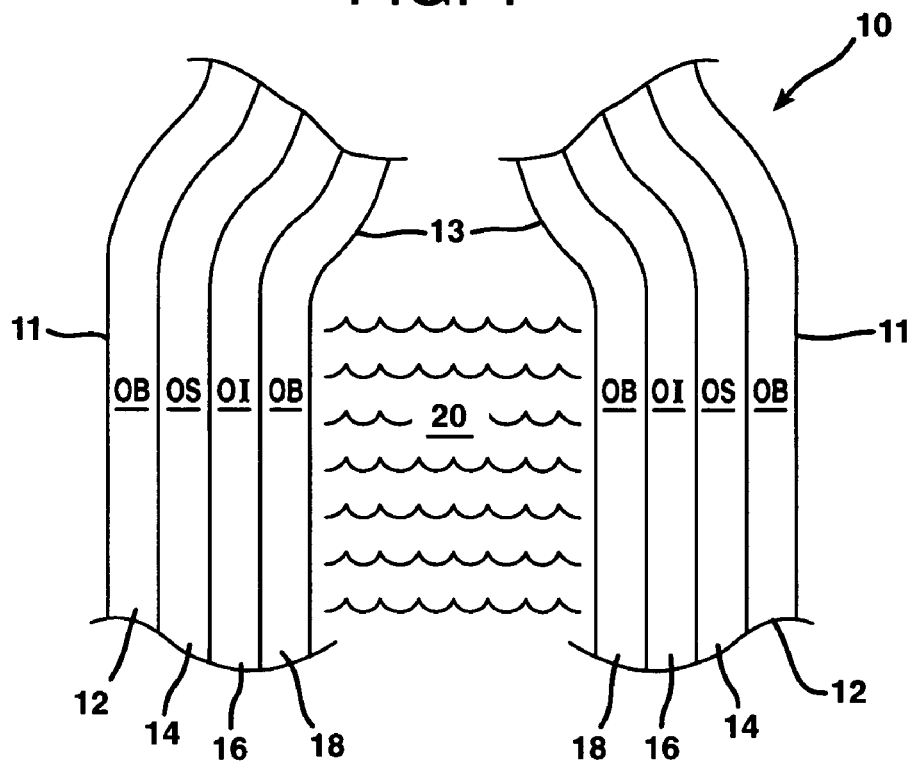
FIG. 1 is a fragmentary, cross-sectional view of a bottle, with an oxygen indicator and oxygen scavenger as components of the bottle wall.

The present invention relates to the use of luminescent compounds to measure concentrations of oxygen dissolved in solids, particularly polymeric materials present in multi-layered packaging materials. Applicants also refer to copending U.S. patent application Ser. No. 09/875,515, filed Jun. 6, 2001, entitled "Oxygen Detection System For A Solid Article", the contents of which are incorporated herein by reference in their entirety. The measurement is made independent of the oxygen concentration of the surrounding atmosphere, because the indicator is disposed in the solid, and is substantially shielded from atmospheric effects (the external atmosphere of the outside environment, as well as the internal atmosphere of any head space oxygen if present), by oxygen barrier layers. The phrase "substantially shielded" herein means that the oxygen scavenger within the rigid container is removing oxygen faster than the oxygen can enter from the environment surrounding the container, and the oxygen indicator is thus not quenched by environmental oxygen during the time that the indicator is to be monitored. Thus, although some small amount of environmental oxygen may enter the rigid container (dependent on factors such as choice of oxygen barrier material, thickness of the container, etc.) during the time the indicator is being monitored for an indication of scavenging activity, this amount is not so large as to affect the luminescent activity of the indicator. These oxygen barrier layers can be discrete layers with a relatively low oxygen transmission rate (OTR), or can be an adhesive or other layer which allows limited ingress of oxygen, but at a rate that allows the indicator to be monitored for an indication of the presence or absence of oxygen dissolved in the solid material carrying the oxygen scavenger, without significant influence from atmospheric effects.

The invention is especially useful as a quality assurance check to verify oxygen scavenger activation during the assembly of packages, including but not limited to bottles, cartons and modified atmosphere and vacuum trayed packages. The method according to the invention is faster and less wasteful than previous methods that rely on measuring oxygen concentration within the headspace of an assembled package. Novel compositions, containers of manufacture, and improved packaging materials for use with these methods are also disclosed.

Luminescent compounds are compounds that strongly absorb electromagnetic radiation (EMR) at one frequency (the excitation frequency), and emit EMR at the same or another frequency (the emitting frequency). Luminescent compounds, appropriate as indicators in the present invention will display luminesce that is quenched by oxygen. More precisely, the indicators will luminesce upon exposure to their excitation frequency with an emission that is inversely proportional to the oxygen concentration. As long as the concentration of oxygen to which the indicators are exposed exceeds a threshold level, the oxygen will effectively prevent, or "quench" luminescence.

The inventors have found that placing a luminescent compound proximate to an oxygen scavenger, and sandwiching the luminescent compound and oxygen scavenger between two appropriate oxygen barrier layers within the packaging material, provides a non-invasive, real-time or rapid indication of scavenger activity. Before triggering the oxygen scavenging reaction, the concentration of oxygen dissolved within the packaging materials will be at ambient equilibrium levels. Such levels will be in excess of threshold level of the properly selected indicator, and sufficient to essentially quench luminescence. After triggering, if scavenging occurs, dissolved oxygen levels near the scavenger will fall rapidly, since the barrier layers will significantly limit the rate of further ingress of environmental oxygen into the solid. As the oxygen concentration passes below threshold levels, an indicator proximate to the scavenger will luminesce when exposed to EMR at the luminescent compound's excitation frequency. The presence, or onset, of luminescence within the package material permits the inference that the scavenger has been triggered successfully.

Active oxygen scavengers consume available oxygen nearest themselves first. Therefore, the concentration of oxygen dissolved in the rigid container within and immediately surrounding the active scavenger will reach threshold levels before such levels are reached in regions that are more distant. "Proximate" herein means the placement of the indicator close enough to the scavenger so that the length of time for reduction in oxygen concentration, by the scavenger, in the region occupied by the indicator, is sufficiently small that those skilled in the art will find the information provided by the indicator to be timely and useful. "Proximate" is thus a relative term that depends on factors readily ascertainable by those of ordinary skill in the art. Such factors include, inter alia, the rate at which the scavenger consumes oxygen, the nature of the indicator, and the permeability of any materials between the scavenger and the indicator.

The indicator can be placed proximate to the oxygen scavenger in a number of ways.

In one embodiment, the indicator can be extruded with the scavenger, using known techniques, such that the indicator and scavenger are in the same layer.

In another embodiment, the indicator may be coated, laminated, or extruded onto another layer, or portion of another layer, within the rigid container. Such a layer may be adjacent to the scavenging layer or separated from the scavenging layer by one or more other oxygen permeable layers.

In yet another embodiment, the indicator can comprise all or part of a printed image.

In still another embodiment, the indicator composition may be coated, laminated, or extruded onto a separate substrate. The substrate/indicator combination could be die cut to form a patch. The patch could then be affixed to the rigid container, optionally with an adhesive or heat seal or the like, such that the indicator faces the permeable, scavenger-occupied side of the rigid container. The inventors found that, *ceteris paribus*, the closer the indicator is to the scavenger, the quicker the luminescent compound will indicate oxygen scavenger activity.

As the scavenger consumes oxygen, migration of new oxygen toward the scavenger from external sources can delay the onset of luminescence by the indicator. The oxygen scavenger is shielded from substantial introduction of oxygen from external sources in the vicinity of the indicator. Shielding allows the scavenger to achieve threshold oxygen concentrations sooner by slowing or preventing the influx of new oxygen to replace the oxygen consumed by the scavenger. Verification of scavenger activity can be made soon after triggering, or at any convenient time thereafter, in ambient atmospheric conditions.

In contrast, conventional methods require the packager or food processor to wait until an unproven section of packaging material has been assembled into a package, a headspace created, and equilibrium among the package layers, package contents, and headspace reached, before evidence of the oxygen scavenging reaction can be confirmed.

Effective shielding is a matter of relative rates. The rate of oxygen influx from external sources (such as from other regions of the package material, the headspace, the product, or the external environment) must be sufficiently less than the rate of oxygen consumption by the scavenger. This will allow the scavenger to reduce the oxygen concentration around the indicator to threshold levels fast enough for the indicator to fulfill its function at a timely (e.g., commercially useful) rate.

Effective shielding of the oxygen scavenger in the vicinity of the indicator can be accomplished by surrounding the scavenger/indicator combination with materials that serve an oxygen barrier function. Such materials include, but are not limited to, the oxygen barrier layer typically present in packaging materials; a barrier patch, i.e., a patch comprising a substrate having oxygen barrier properties; the substrate upon which the indicator composition is placed when the indicator forms part of a patch (such as a metallized or Saran coated PET substrate); the scavenger layer itself, serving a dual function as scavenger and active oxygen barrier; a low oxygen content oxygen sensitive product filling the interior cavity of a rigid container such as a bottle; or any combination thereof. Additionally, oxygen permeable materials may, alone or together with other materials, serve as effective barriers if their permeability, inherently or by adjustment, is low enough to achieve the rate balance just described. Even the external, lateral, or outer portions of the indicator composition itself may serve the oxygen barrier function with respect to the interior portions of the indicator composition by appropriate selection of the material thickness.

Oxygen barrier properties of the barrier layer of the packaging materials and patches just described would permit a maximum oxygen transmission rate (OTR) of 100 $cc/m^2/24$ hr at 25° C., 0% RH, 1 atm oxygen (ASTM D 3985). Preferably, the oxygen barrier properties of the barrier layers would permit a maximum OTR of 50 $cc/m^2/24$ hr at 25° C., 0% RH, 1 atm oxygen. More preferably, the oxygen barrier property of the oxygen barrier layer would permit a maximum OTR of 25 $cc/m^2/24$ hr at 25° C., 0% RH, 1 atm oxygen. Most preferably, the oxygen barrier property of the oxygen barrier layer would permit a maximum OTR of 1 $cc/m^2/24$ hr at 25° C., 0% RH, 1 atm oxygen.

All polymeric materials are capable of providing these oxygen permeation rates, provided their cross-sectional thickness is sufficient. A polyethylene, with an oxygen-transmission of 2000 $cc/m^2/24$ hr at 25° C., 0% RH, 1 atm oxygen at a thickness of 1 mil, will meet the 100 $cc/m^2/24$ hr at 25° C., 0% RH, 1 atm oxygen barrier requirement described above if the cross-sectional thickness exceeds 20 mils. Materials that are capable of providing the oxygen barrier requirements at relatively thin cross-sectional thickness include, but are not limited to, polyester (PET), polyamides, ethylene vinyl alcohol copolymer, polyvinyl alcohol homopolymer, polyvinyl chloride, homopolymer and copolymer of polyvinylidene chloride, polyethylene naphthalate, polyacrylonitrile homopolymer and copolymer, and liquid crystal polymer. Additionally, the oxygen barrier properties of polymeric materials can be enhanced by depositing a thin coating of carbon, metal, metal oxide, silica and/or silicon oxide, and $SiO_x$. Epoxy-amine and carbon coatings are well known to be used to enhance the barrier of materials such as PET. It is also known that barrier properties of polymeric materials can also be enhanced through melt blending a polymer with glass, clay, and/or a polymer having a relatively low oxygen transmission rate (i.e. a relatively high oxygen barrier). It can also be enhanced through blending polymers, metals, metal halides, etc., with oxygen scavenging materials.

From the foregoing discussion, one of ordinary skill in the art will appreciate that the minimum amount of time needed for a luminescent composition to indicate scavenger activity depends on the interplay of several factors. Such factors include, inter alia, the rate at which the scavenger consumes oxygen, the proximity of the indicator to the scavenger, the permeability of any materials between the scavenger and the indicator, the threshold at which the luminescent compounds respond to changes in oxygen concentrations, the amount of oxygen that must be removed in order to reach threshold levels, the species of luminescent compound(s) used, the ambient temperature, and the effectiveness of any shielding present.

The minimum amount of time between triggering and detection may also be influenced by the factors listed above, and by engineering considerations or quality assurance criteria as well. Thus, in contrast to previous methods which typically take in excess of 18 hours, the present invention allows one to verify oxygen scavenging activity often within 1 hour of triggering, optionally within 30 minutes of triggering, optionally within 10 minutes of triggering, optionally within 5 minutes of triggering, optionally immediately after triggering, or any time period intermediate thereto. Put another way, it will be preferable in some instances to detect the presence or absence of luminescence immediately after the portion of the film to be tested leaves the triggering apparatus, within minutes thereafter, at any suitable place along the assembly line, or after the assembled package leaves the assembly line.

Those interested in tracking the continued progress of the oxygen scavenger activity may test, or re-test, the indicator for scavenging activity any suitable number of times thereafter. Such intervals include, for example, at 30 minutes, 1 hour, 4 hours, 24 hours, 1 month, and so on.

The figures present non-limiting, exemplary arrangements of scavengers, indicators and barriers according to the invention. For simplicity, additional layers that may be present (or absent) in a rigid container are not universally shown. One of ordinary skill in the art will appreciate, however, that (1) such additional layers, including sealant layers and the like, and including polymeric layers such as olefinic layers, may be added or subtracted without departing from the spirit or scope of the invention, and that (2) the rigid container, such as a bottle, although illustrated in most of the drawings as a section disposed proximate an oxygen sensitive product, will preferably entirely surround the oxygen sensitive product, or else form a bottle, carton, lidstock and/or tray to be used in conjunction with other appropriate packaging components, such as caps, crowns, or other closures to package an oxygen sensitive product.

The rigid container of the invention will typically be either rigid (able to stand up even when empty), such as a polymeric bottle, a trayed package having a lid; a cup or tub; or a component associated with a rigid article, such as a liner for a metal can, a liner for a paperboard carton, "bag in box" applications, or the like; or a stand up pouch (either the primary pouch itself or an insert or liner for the pouch).

FIGS. 1 to 6 depict a bottle where the indicator forms an integral component of the primary packaging material. Each bottle forms an internal cavity for storing an oxygen sensitive product. Those skilled in the relevant art will understand that a bottle can be molded by conventional processes, and that after filling the formed bottle, a closure mechanism such as a cap or crown can be used to seal the opening of the bottle.

FIG. 1 is a fragmentary, cross-sectional view of a bottle, with an oxygen indicator and Oxygen scavenger as components of the bottle.

In FIG. 1, a bottle 10 includes an exterior surface 11, a layer 12 comprising an oxygen barrier, and an interior surface 13. Suitable oxygen barriers are disclosed above.

The oxygen sensitive product 20 that can be contained in the cavity formed by bottle 10 can be e.g. a foodstuff such as an alcoholic or non-alcoholic, carbonated or non-carbonated beverage, coffee, tea, parenteral/enteral nutrition, adult/baby formula, fruit juice, pulverulent foods such as spice products, or condiments; or a non-food item.

Layer 14 comprises an oxygen scavenger. Suitable oxygen scavengers are e.g. oxidizable organic compound and a transition metal catalyst; ethylenically unsaturated hydrocarbon and a transition metal catalyst; a reduced form of a quinone, a photoreducible dye, or a carbonyl compound which has absorbence in the UV spectrum; a polymer having a polymeric backbone, cyclic olefinic pendent group, and linking group linking the olefinic pendent group to the polymeric backbone; a polymer having cyclic unsaturated groups in the backbone; a copolymer of ethylene and a strained, cyclic alkylene; ethylene/vinyl aralkyl copolymer; ascorbate; isoascorbate; sulfite; ascorbate and a transition metal catalyst, the catalyst comprising a simple metal or salt, or a compound, complex or chelate of the transition metal; a transition metal complex or chelate of a polycarboxylic acid, salicylic acid, or polyamine; tannin; or reduced metal such as iron.

Layer 16 comprises an oxygen indicator comprising a luminescent compound, disclosed in more detail hereinbelow.

A second oxygen barrier layer 18 is disposed on the interior side of the bottle, and functions, along with oxygen barrier layer 12, to substantially shield the oxygen indicator from sources of oxygen exterior to the bottle. Suitable oxygen barriers are disclosed above. The bottle, other rigid containers disclosed herein, and their component layers, can be of any suitable thickness.

Figure 2:
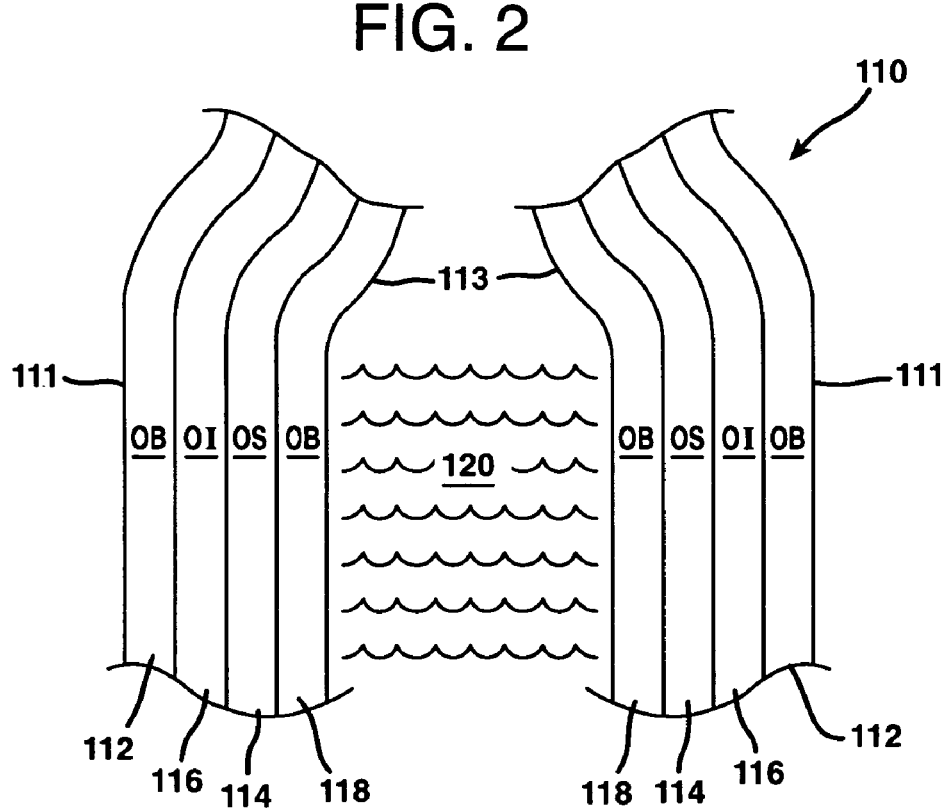
FIG. 2 is a fragmentary, cross-sectional view of a bottle, like that of FIG. 1, but with the oxygen indicator and oxygen scavenger in positions within the bottle wall different from those of FIG. 1.

FIG. 2 is a fragmentary, cross-sectional view of a bottle 110, like bottle 10 of FIG. 1, but with the oxygen indicator and oxygen scavenger in positions within the bottle different from those of FIG. 1. Layers 112, 114, 116, and 118 of FIG. 2 correspond to layers 12, 14, 16, and 18 of FIG. 1. The bottle of FIG. 2 has an exterior surface 111, and an interior surface 113. The oxygen sensitive product 120 that can be contained in the cavity formed by bottle 110 can be any of those disclosed for the oxygen sensitive product 20 of FIG. 1.

FIG. 3 is a fragmentary, cross-sectional view of a bottle 210, like bottle 10 of FIG. 1, but without the second oxygen barrier layer. Layers 212, 214, and 216 of FIG. 3 correspond to layers 12, 14, and 16 of FIG. 1. The bottle of FIG. 3 has an exterior surface 211, and an interior surface 213. The oxygen sensitive product 220 that can be contained in the cavity formed by bottle 210 can be any of those disclosed for the oxygen sensitive product 20 of FIG. 1.

It will be noted that the bottle of FIG. 3 has no second oxygen barrier layer. A second oxygen barrier layer, such as layer 18 of FIG. 1, is optional but not necessary for some applications. Where the bottle creates a hermetic package, and/or the oxygen sensitive product has a relatively low oxygen content, the oxygen indicator may be sufficiently isolated from sources of oxygen exterior to the bottle to provide adequate functioning of the oxygen indicator without the need for a second oxygen barrier layer.

FIG. 4 is a fragmentary, cross-sectional view of a bottle 310, like bottle 110 of FIG. 2, but without the second-oxygen barrier component. Layers 312, 314, and 316 of FIG. 4 correspond to layers 112, 114, and 116 of FIG. 2. The bottle of FIG. 4 has an exterior surface 311, and an interior surface 313. The oxygen sensitive product 320 that can be contained in the cavity formed by bottle 310 can be any of those disclosed for the oxygen sensitive product 120 of FIG. 2.

Figure 5:
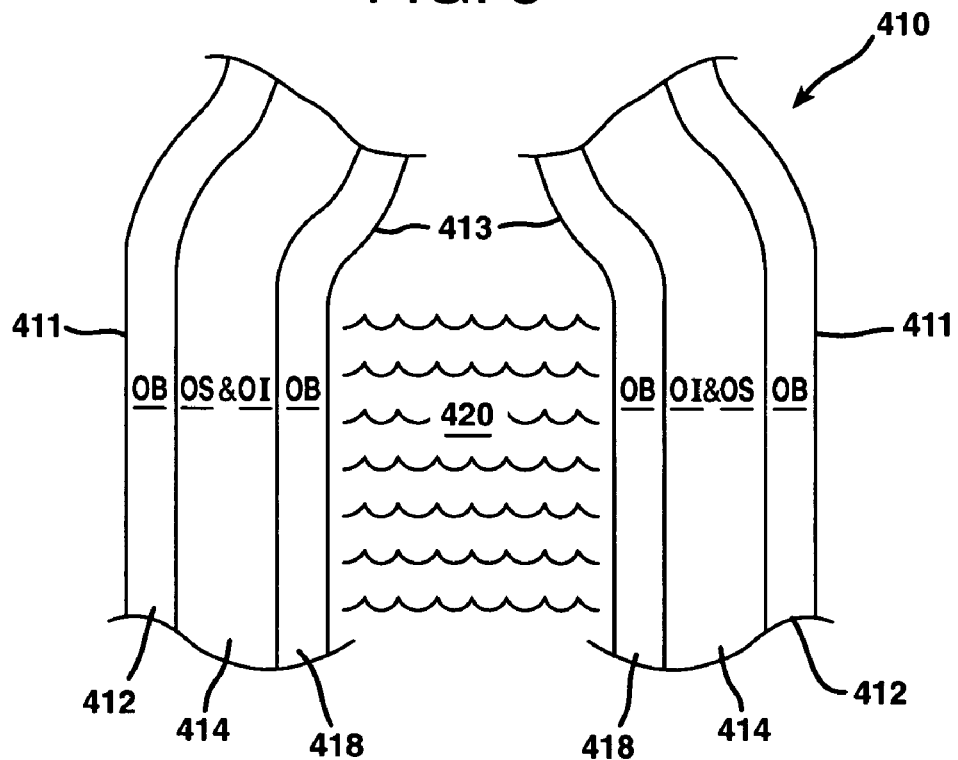
FIG. 5 is a fragmentary, cross-sectional view of a bottle, like that of FIG. 1, but with the oxygen indicator and oxygen scavenger blended together in a single layer.

FIG. 5 is a fragmentary, cross-sectional view of a bottle 410, like bottle 10 of FIG. 1, but with the oxygen indicator and oxygen scavenger blended together in a single layer. Thus, layer 414 comprises a blend, in any suitable relative amounts, of an oxygen indicator and an oxygen scavenger. Suitable oxygen indicators are disclosed herein, and will exhibit oxygen quenched luminescence, i.e. will luminesce in the absence of oxygen.

The indicator can be present in layer 414 in an amount of between 0.001% and 10%, by weight of the layer 414. The scavenger can be present in layer 414 in an amount of between 99% and 1%, by weight of the layer 414. Layers 412 and 418 of FIG. 4 correspond to layers 12 and 18 of FIG. 1. Layer 414 of FIG. 5 corresponds to a combination of layers 14 and 16 of FIG. 1. The bottle of FIG. 5 has an exterior surface 411, and an interior surface 413. The oxygen sensitive product 420 that can be contained in the cavity formed by bottle 410 can be any of those disclosed for the oxygen sensitive product 20 of FIG. 1.

Figure 6:
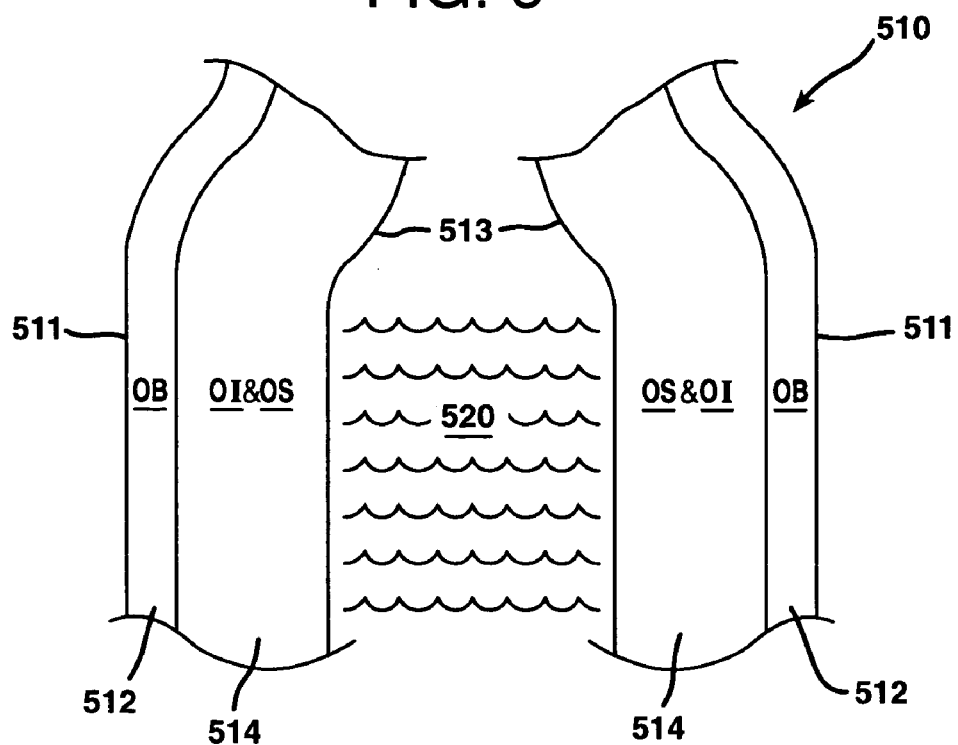
FIG. 6 is a fragmentary, cross-sectional view of a bottle, like that of FIG. 5, but without the second oxygen barrier component.

FIG. 6 is a fragmentary, cross-sectional view of a bottle 510, like bottle 410 of FIG. 5, but without the second oxygen barrier component. Layers 512 and 514 of FIG. 6 correspond to layers 412 and 414 of FIG. 5. The bottle 510 of FIG. 6 has an exterior surface 511, and an interior surface 513. The oxygen sensitive product 520 that can be contained in the cavity formed by bottle 510 can be any of those disclosed for the oxygen sensitive product 20 of FIG. 1.

Figure 7:
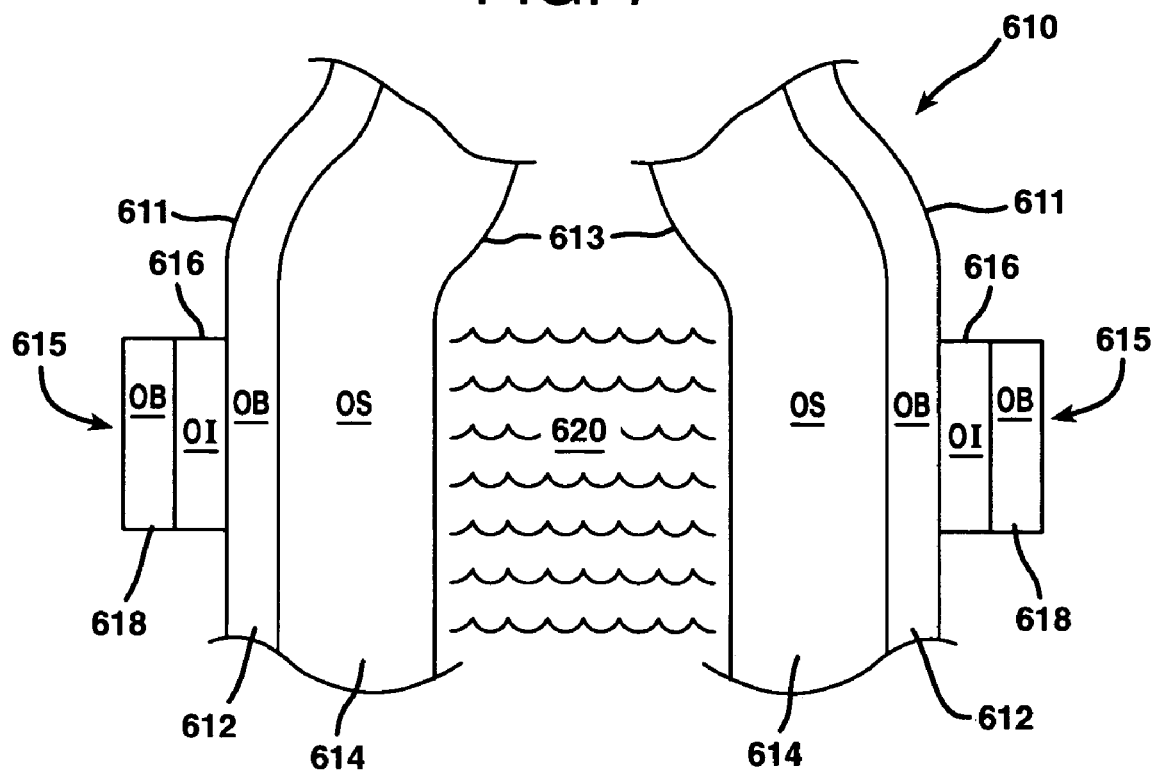
FIG. 7 is a fragmentary, cross-sectional view of a bottle, with an oxygen indicator patch adhered to an exterior surface of the bottle.

FIG. 7 is a fragmentary, cross-sectional view of a bottle 610, with an oxygen indicator patch 615 adhered to the exterior surface 611 of the bottle. Layers 612 and 614 of FIG. 6 correspond to layers 12 and 14 of FIG. 1. The bottle 610 of FIG. 7 has an interior surface 613. The oxygen sensitive product 620 that can be contained in the cavity formed by bottle 610 can be any of those disclosed for the oxygen sensitive product 20 of FIG. 1.

The patch 615 can be affixed to the bottle surface 611 by any suitable means, such as with an adhesive, such as pressure sensitive adhesive, heat sealing, RF sealing, thermoplastic hot melt adhesives, silicone adhesives, acrylic pressure sensitive adhesives, solvent cast adhesives, UV (ultraviolet) or EB (electron beam) cured acrylic adhesives, or the like.

Although the patch 615 is shown in FIG. 7 as attached to the exterior (outside) side of bottle 610, the patch can in fact be disposed on either the interior (oxygen sensitive product side) or exterior side of the bottle, or both. If the oxygen scavenger is displaced more toward one side of the bottle than the other, then the patch is preferably disposed on that side of the bottle that will bring the indicator into closer proximity to the oxygen scavenger.

The patch 615 of FIG. 7 can for convenience be considered as part of the bottle, even though the patch will typically be smaller in area than, and thus not coextensive with the total area of bottle 610, and even though the patch will typically be made independently of the bottle. Layer 618 comprises an oxygen barrier as described herein for e.g. layer 612, and an oxygen indicator layer 616 as disclosed herein for e.g. layer 16 of FIG. 1. When more than one oxygen barrier layers are used in a bottle, the two or more oxygen barrier layers can be the same or different.

Figure 8:
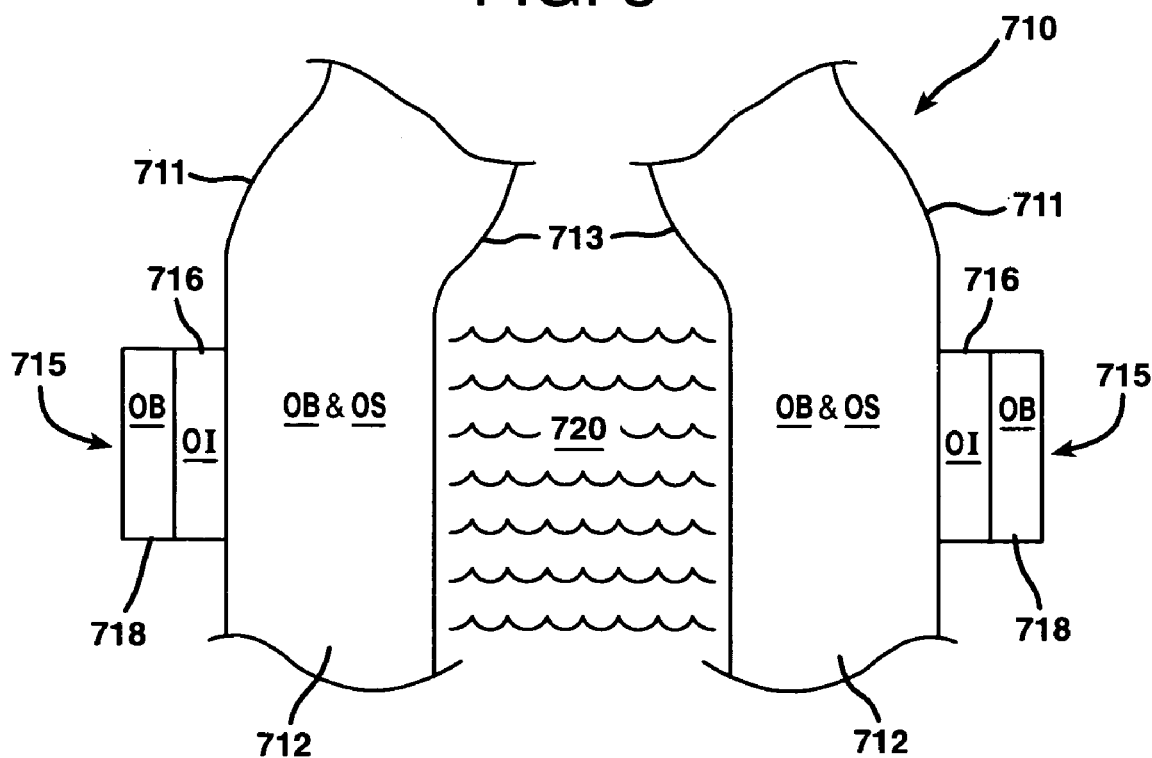
FIG. 8 is a fragmentary, cross-sectional view of a bottle, like that of FIG. 7, but with the oxygen barrier of the bottle blended with the oxygen scavenger.

FIG. 8 is a fragmentary, cross-sectional view of a bottle 710, with an oxygen indicator patch adhered to an exterior surface of the bottle, like the bottle 610 of FIG. 7, but with the oxygen barrier of the bottle blended with the oxygen scavenger in a single layer. Layer 712 of FIG. 8 thus corresponds to a combination of layers 612 and 614 of FIG. 7. The bottle 710 of FIG. 8 has an exterior surface 711 and interior surface 713. The oxygen sensitive product 720 that can be contained in the cavity formed by bottle 710 can be any of those disclosed for the oxygen sensitive product 20 of FIG. 1.

The patch 715 can be affixed to the package material by any suitable means, such as with an adhesive or heat seal or the like.

The patch 715 is shown in FIG. 8 as attached to the exterior (outside) side of bottle 710, but can in fact be disposed on either the interior (oxygen sensitive product side) or exterior side of the bottle 710, or both.

The patch 715 corresponds to patch 615 of FIG. 7, and layers 718 and 716 correspond to layers 618 and 616 respectively of FIG. 7.

Figure 9:
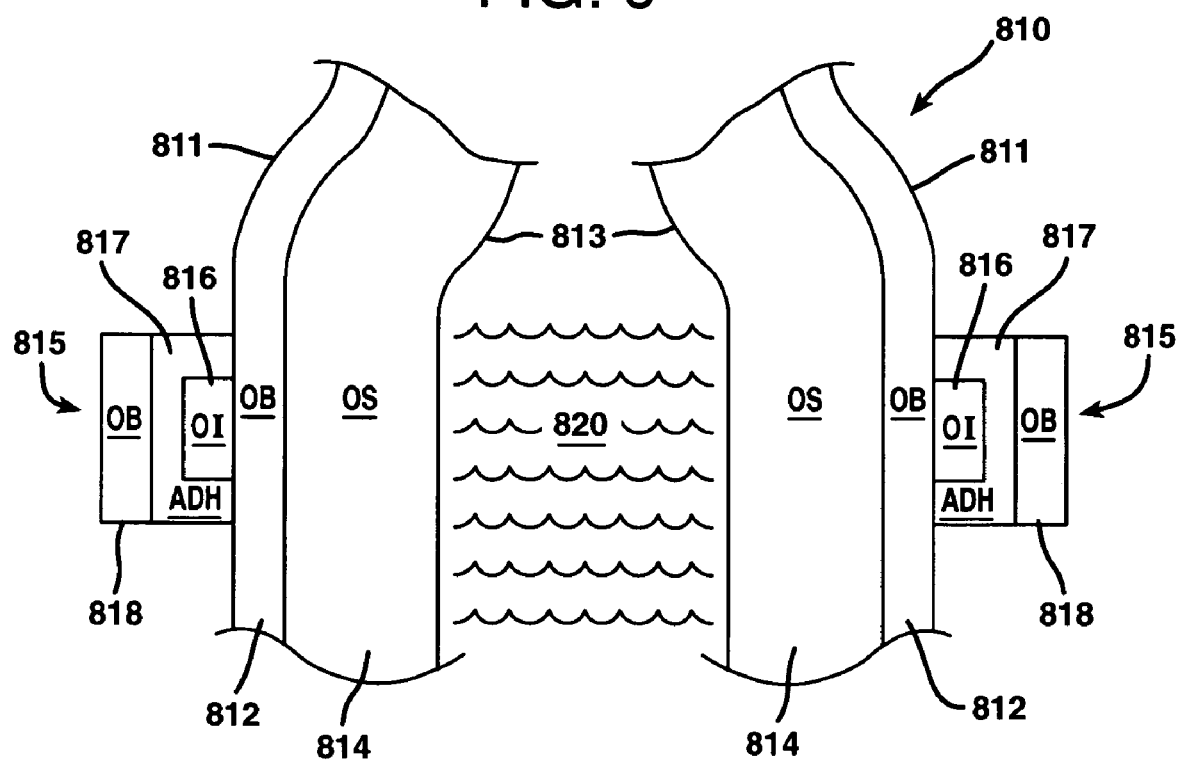
FIG. 9 is a fragmentary, cross-sectional view of another embodiment of a bottle with an oxygen indicator patch adhered to an exterior surface of the bottle.

FIG. 9 is a fragmentary, cross-sectional view of a bottle 810, with an oxygen indicator patch adhered to an exterior surface of the bottle, like the bottle 610 of FIG. 7, but with an adhesive layer 817 that partially encapsulates oxygen indicator layer 816. The oxygen indicator can be disposed, for example as a printed image, on adhesive layer 817, and then the entire patch 815 can be adhered, by use of the adhesive, to the exterior surface 811. Layers 812 and 814 of FIG. 9 correspond to layers 12 and 14 of FIG. 1. The bottle 810 of FIG. 9 has an interior surface 813. The oxygen sensitive product 820 that can be contained in the cavity formed by bottle 810 can be any of those disclosed for the oxygen sensitive product 20 of FIG. 1.

Figure 10:
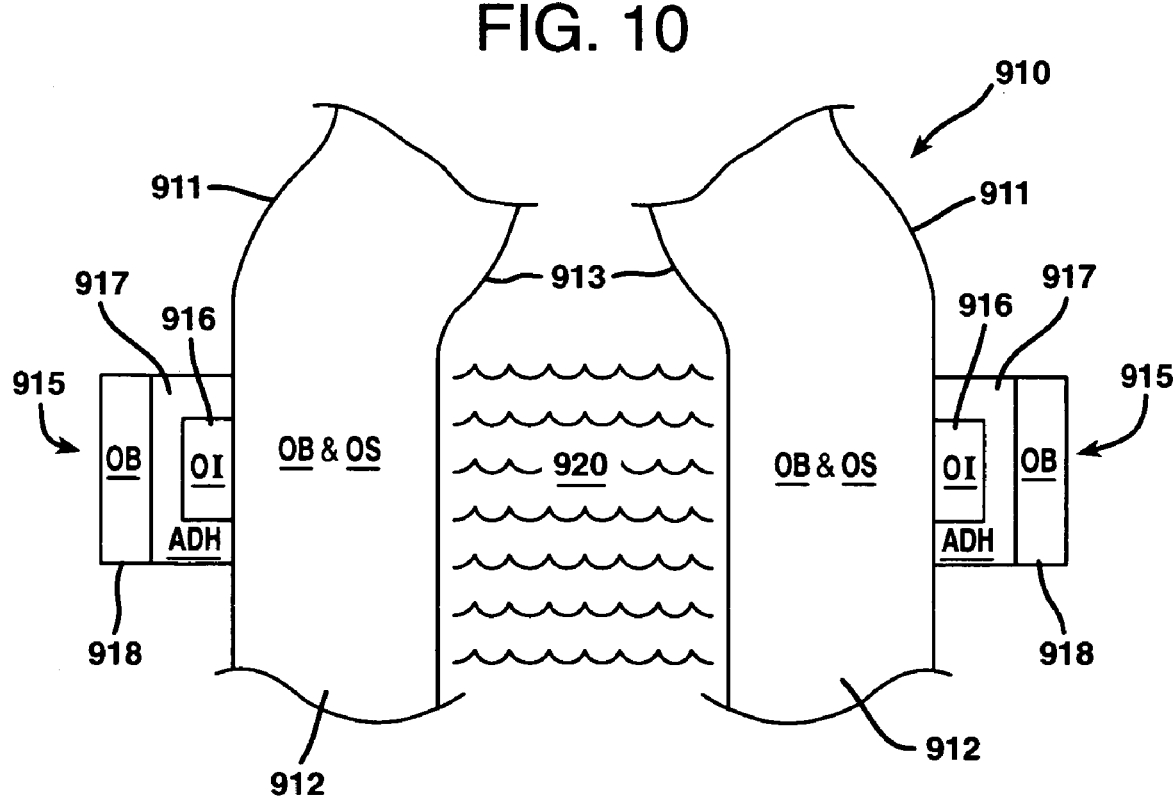
FIG. 10 is a fragmentary, cross-sectional view of still another embodiment of a bottle with an oxygen indicator patch adhered to an exterior surface of the bottle.

FIG. 10 is a fragmentary, cross-sectional view of a bottle 910, with an oxygen indicator patch adhered to an exterior surface of the bottle, like the bottle 710 of FIG. 8, but with an adhesive layer 917 that partially encapsulates oxygen indicator layer 916. The oxygen indicator can be disposed, for example as a printed image, on adhesive layer 917, and then the entire patch 915 can be adhered, by use of the adhesive, to the exterior surface 911. Layer 912 of FIG. 10 thus corresponds to layer 712 of FIG. 8. The bottle 910 of FIG. 10 has an exterior surface 911 and interior surface 913. The oxygen sensitive product 920 that can be contained in the cavity formed by bottle 910 can be any of those disclosed for the oxygen sensitive product 20 of FIG. 1.

The lateral end regions of the oxygen indicator can act to help shield a central portion of the indicator layer from environmental oxygen. Thus, the central part of the indicator, furthest removed from the lateral extremities of an oxygen indicator within a patch, can be the target area that is monitored for luminescence.

For embodiments including a patch, applicants note that:
the patch can be affixed to the bottle by any suitable means, such as with an adhesive, such as pressure sensitive adhesive, heat sealing, RF sealing, or the like;
the patch can form part of an otherwise conventional shrink sleeve or label, such as those currently installed commercially on the outer surface of two liter beverage containers, beer and wine bottles, and the like;
the patch can take the form of a small eye spot on such an otherwise conventional label;
the patch can wrap around the bottle completely, or extend only a limited distance around the circumference of a round bottle, or the perimeter of a polygonal bottle; and
the thickness of the patch can vary, and as shown in the drawings is exaggerated for purposes of clarity;
the patch can have any suitable size and geometry; and
It is preferred that the patch be on the exterior surface of the bottle, because of relative ease in applying the patch (for example during a bottle extrusion or filling operation), compared with installation of a patch on the interior surface of the bottle, and because of relative ease in reading or detecting luminescence by machine or human eye from the outside of the bottle.

In some embodiments, the oxygen indicator and the oxygen scavenger occupy different layers. Although the oxygen scavenger and oxygen indicator layers are usually shown in adjacent layers, they may also be separated by one or more sufficiently oxygen permeable layers as well. For example, one or more oxygen permeable layers such as ethylene or propylene polymers and copolymers can be included in the bottle structure in any suitable position, and can function as further structural support for the rigid container, as bulk layers, as layers to reduce the overall cost of the container, as carriers for additives, as a printable surface, etc. In each instance, the oxygen barrier layer and/or other nearby materials provide shielding of the indicator from environmental oxygen. In some cases, the oxygen scavenger layer itself helps provide shielding. The scavenging layer can thus function both as a scavenger and as an active oxygen barrier.

A general feature of the present invention is that the oxygen indicator is shielded from environmental oxygen, including oxygen present outside the finished package, as well as any head space oxygen if present, or oxygen dissolved in the oxygen sensitive product if present, during the time that the indicator is to be monitored for an indication of the presence or absence of oxygen dissolved in the rigid material carrying the oxygen scavenger.

Figure 11:
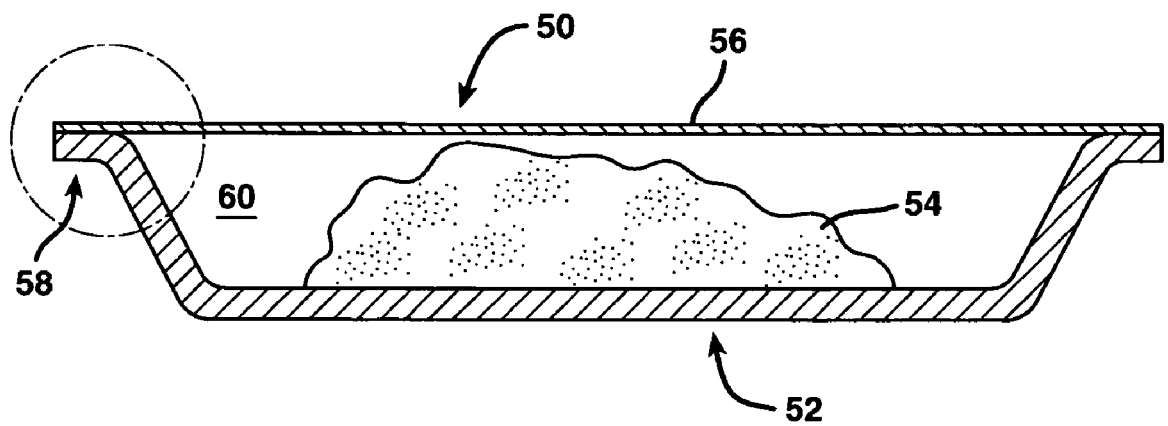
FIG. 11 is a cross sectional view of a trayed product with a lid.

FIG. 11 shows a rigid container 50 including a tray 52, with an oxygen sensitive product 54, such as ground beef, shown disposed in the cavity 60 of the tray; and a lidstock 56 sealed to the tray flange 58. The encircled section of FIG. 11 is enlarged in FIG. 12. Oxygen sensitive products which can be stored in the cavity of the tray include e.g. red meat, processed meat, poultry, cheese, pumpable food, refrigerated prepared food, snack food, bakery product, candy or confectionery product, dried fruit, vegetable, nut, frozen food, cereal, grain, grain product, dehydrated juice mix, fresh produce, or a non-food item such as a medical or pharmaceutical, electronic, recorded programming, personal care or cosmetic, fertilizer, pesticide, herbicide, tobacco, metal, or chemical product.

Figure 12:
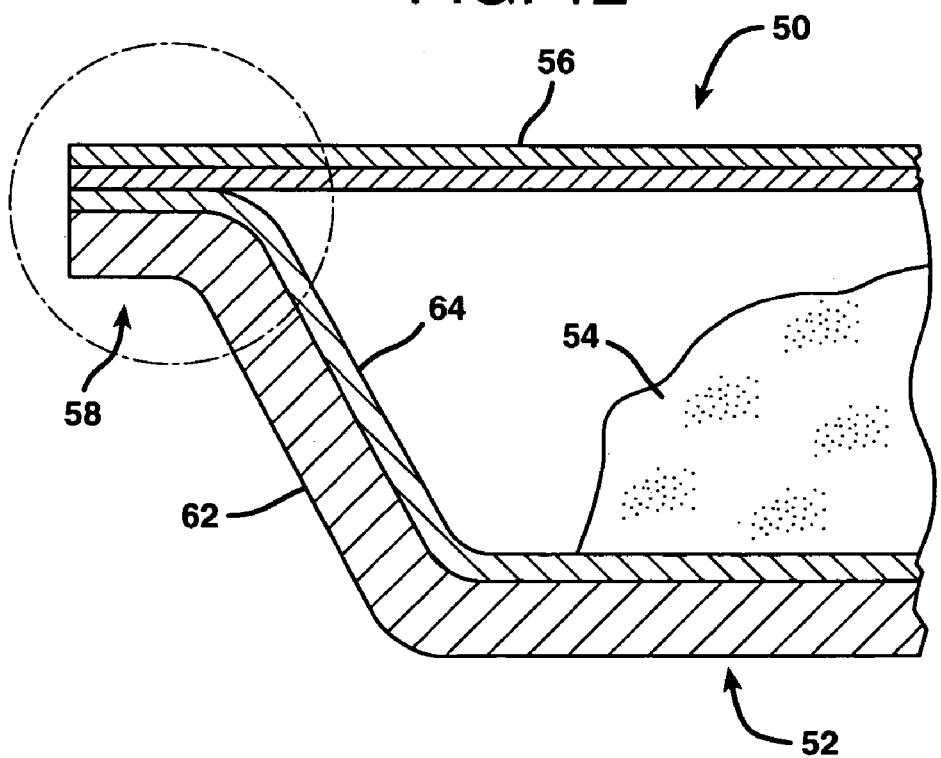
FIG. 12 is an enlarged cross sectional view of the encircled area of FIG. 11.

FIG. 12 shows the tray 52 comprising a polymer layer 62 comprising e.g. polystyrene, polyethylene terephthalate (PET), or polypropylene, foamed or unfoamed, and also comprising a liner 64 adhered to the polymer layer, and comprising a material of the type disclosed in more detail herein. This liner 64 provides one or more of various properties to the tray portion of the package. The lidstock 56 preferably comprises multiple layers. In FIG. 12, lidstock 56 is simply shown as two layers for sake of clarity; other Figures show in more detail specific embodiments of lidstock 56. The encircled section is enlarged in FIGS. 13 through 18.

Figure 13:
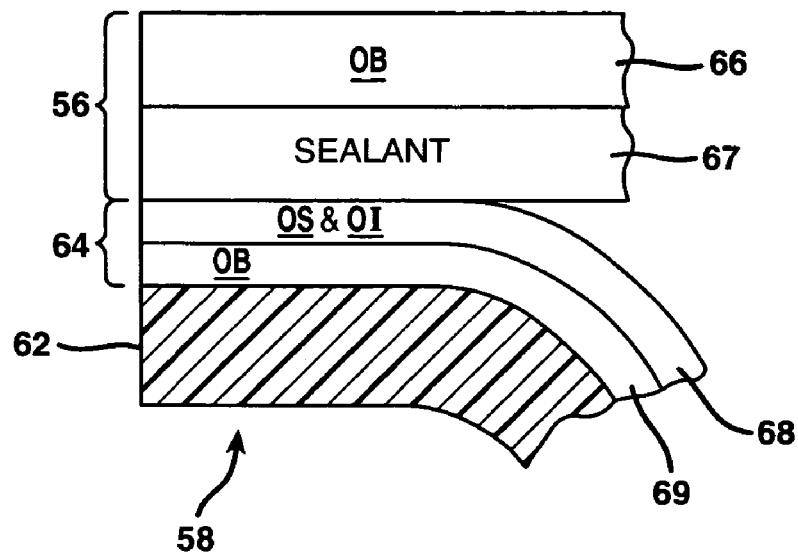
FIG. 13 is a cross-sectional view of the encircled area of FIG. 12.

FIG. 13 shows the lidstock 56 sealed to the tray flange 58 of tray 52 by heat sealing according to methods well known in the art. More specifically, the sealant layer 67 of lidstock 56 is sealed to the barrier liner 64 of tray 52 in the tray flange 58 portion of tray 52. The oxygen barrier (OB), oxygen scavenger (OS), and oxygen indicator (OI) correspond respectively in function and composition to those shown elsewhere herein. The lidstock 56 includes oxygen barrier layer 66, and sealant layer 67. The liner 64 includes a layer 68 comprising a blend, in any suitable proportions, of the oxygen scavenger and oxygen indicator. Liner 64 also includes an oxygen barrier layer 69. The tray 62 can be of any suitable polymeric material including, polystyrene, polypropylene, or polyethylene terephthalate (PET), each foamed or unfoamed.

Those skilled in the art will appreciate, after a review of this disclosure, that although the examples disclosed herein and in the Figures emphasis the use of a tray liner, in some cases the functionality offered by the liner (oxygen indication, oxygen scavenging, sealing, and/or oxygen barrier) can be built into the tray itself, without the need for a liner per se, or at least without the need for a liner having all the required functionalities. For example, a PET tray offers some level of oxygen barrier, so that the tray liner can include one or more of the other required functionalities without the need for an oxygen barrier material in the liner itself. Alternatively a tray, cup or bottle can be formed directly from a multilayered construction without a discrete liner.

Suitable examples of sealant materials include an olefinic polymer such as ethylene/alpha olefin copolymer, homogeneous ethylene/alpha olefin copolymer, ethylene/vinyl acetate copolymer, ethylene/alkyl acrylate copolymer, ethylene/acrylic acid copolymer, ionomer, propylene homopolymer and copolymer, butylene polymer and copolymer, multi-component ethylene/alpha-olefin interpenetrating network resin, a blend of a propylene homopolymer and a propylene/ethylene copolymer, high density polyethylene, a blend of high density polyethylene and ethylene/vinyl acetate copolymer, a blend of high density polyethylene and low density polyethylene; or a blend of any of these materials; polyamide or copolyamide; or other appropriate polymeric materials. This layer will typically be closest to the oxygen sensitive product and serve to provide a means to seal the film to itself or a tray liner or the like (in the case of a trayed product) during a packaging operation.

Figure 15:
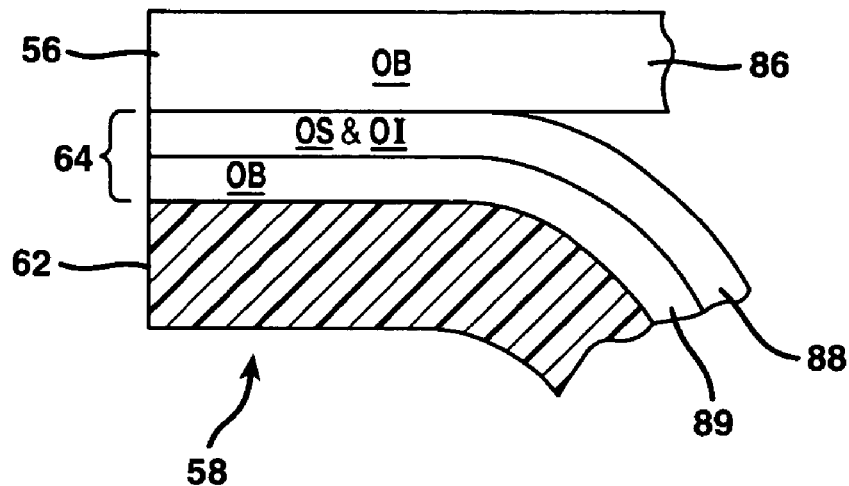
FIG. 15 is a cross-sectional view of another embodiment of the encircled area of FIG. 12.

Sealants are optional, depending on the sealability of materials at the interface of the lidstock and tray or (if present) tray liner. FIG. 15 shows such an embodiment. Layers 86, 88, and 89 correspond to layers 66, 68, and 69 respectively of FIG. 13.

Figure 14:
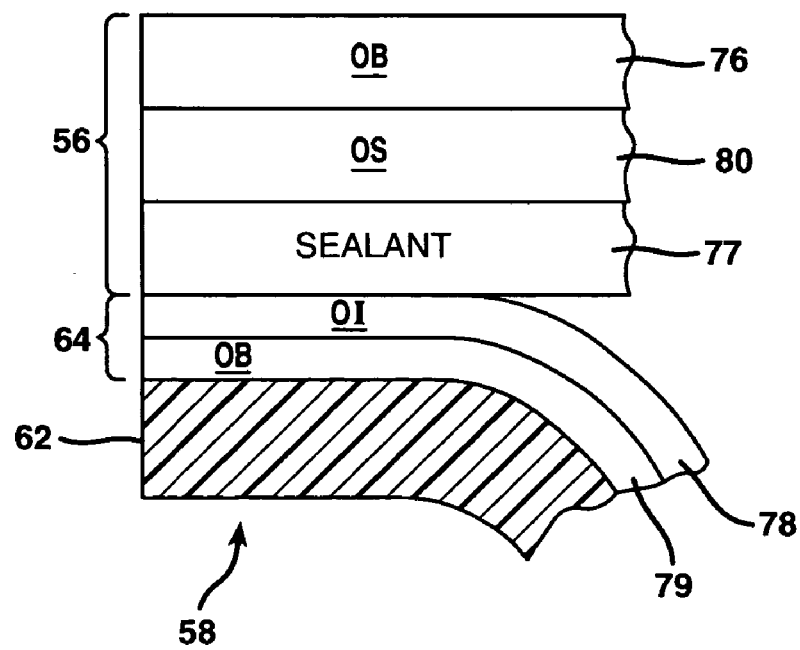
FIG. 14 is a cross-sectional view of another embodiment of the encircled area of FIG. 12.

FIG. 14 shows an embodiment like FIG. 13, but in which the oxygen scavenger and oxygen indicator are in separate layers. Layers 76, 77, and 79 therefore correspond to layers 66, 67, and 69 of FIG. 13. Lidstock 56 of FIG. 14 also includes an oxygen scavenger layer 80. Layer 78 of liner 64 comprises an oxygen indicator.

Figure 16:
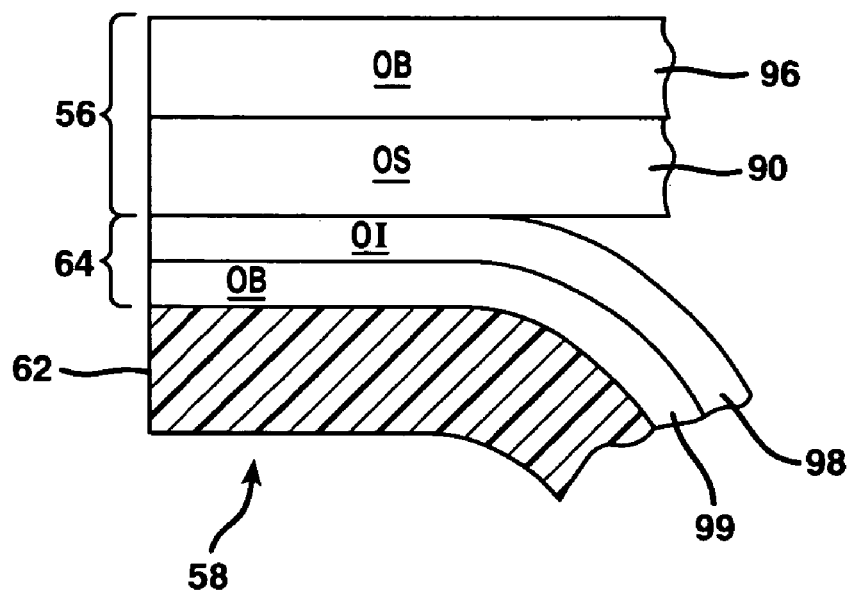
FIG. 16 is a cross-sectional view of another embodiment of the encircled area of FIG. 12.

FIG. 16 is like FIG. 14, but without a sealant layer. Thus, layers 96, 90, 98, and 99 correspond to layers 76, 80, 78, and 79 respectively of FIG. 14.

Figure 17:
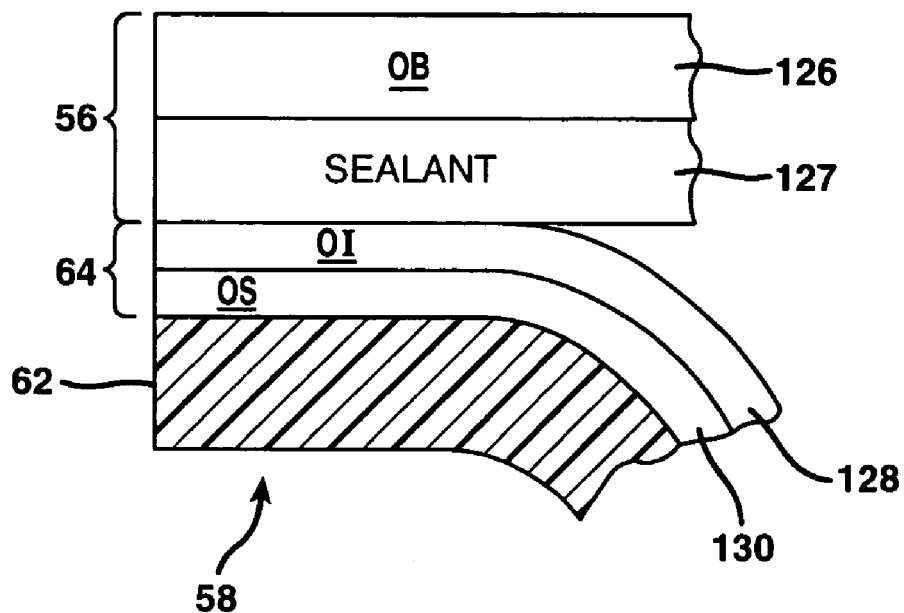
FIG. 17 is a cross-sectional view of another embodiment of the encircled area of FIG. 12.

FIG. 17 discloses an embodiment like FIG. 13, but in which the tray liner 64 including an oxygen indicator layer 128 and an oxygen scavenger layer 130. Tray liner 64 also requires no separate oxygen barrier layer comparable to layer 69 of FIG. 13. Layers 126 and 127 of FIG. 17 correspond to layers 66 and 67 respectively of FIG. 13.

Figure 18:
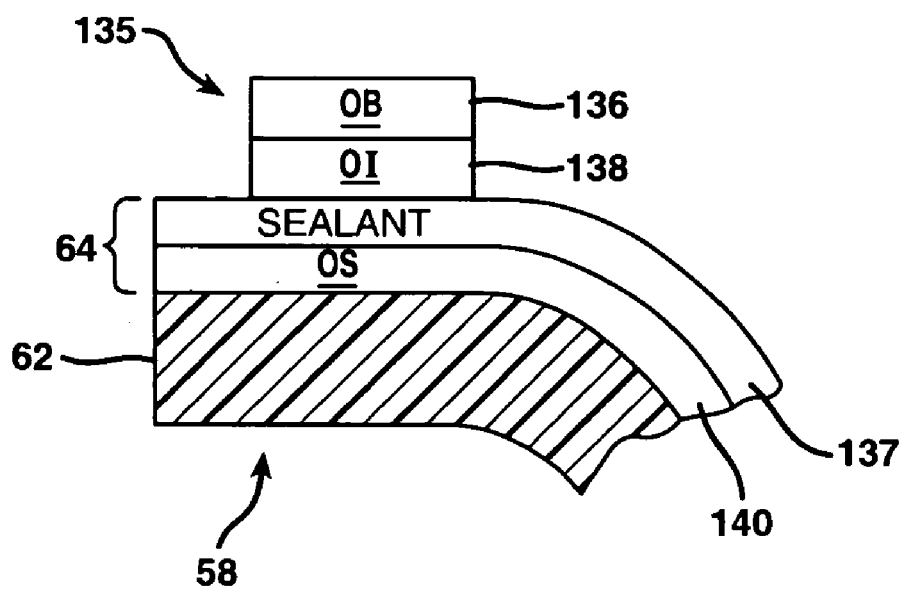
FIG. 18 is a cross-sectional view of another embodiment of the encircled area of FIG. 12.

FIG. 18 discloses a patch 135 disposed on the tray flange 58, adhered to the tray liner 64. Oxygen barrier layer 136 and oxygen indicator layer 138 correspond in composition to those disclosed in other embodiments. The patch is adhered, e.g. by heat sealing or other suitable means, to sealant layer 137 of tray liner 64. An oxygen scavenger layer 140 corresponds e.g. to layer 130 of FIG. 17.

Those skilled in the art will understand that variations in the arrangement of layers in these embodiments are possible. For example, the position of the oxygen scavenger and oxygen indicator layers in FIG. 17 can be reversed. Also, the oxygen barrier and oxygen scavenger of FIG. 14 can in some cases be used in a single layer.

In each of these embodiments, it is not necessary to place indicator compositions everywhere the scavenger composition resides. It may be sufficient (and less expensive) to place indicators only in portions of the packaging material instead. For example, one may affix indicator patches to the packaging materials at set time or distance intervals, to provide sufficiently frequent scavenger verification for quality assurance purposes. The substrates of the patches may optionally contain metal or other machine-detectable backing. Metal or other detectors may be set up along the assembly line to ensure that patches are not inadvertently left with the assembled package where the consumer may misinterpret the information the indicator provides. Eye spots or other suitable indexing marks can be used to register the web in a packaging process. The indicator can be applied by printing in registration with other graphics comprising a product label. Where the scavengers comprise a component of one or more layers of a rigid container, one could include the indicators in the form of a pattern, such as a strip, spot, coupon, or grid. These strips, spots, coupons, or grids could be placed periodically along a portion, such as along an edge or in a row, of the material containing the oxygen scavenger. Such portions may or may not be placed such that they ultimately become part of the assembled package. A suitable barrier patch or layer or coating is used in conjunction with such strips, spots, coupons, or grids, to ensure that the oxygen indicator is shielded from environmental oxygen during the time that the indicator is to be monitored for an indication of the presence or absence of oxygen dissolved in the solid material carrying the oxygen scavenger.

Alternatively, the eyespot can itself carry an oxygen indicator. The eye spot will typically become part of the sealed edge, flange, sleeve, or patch of a bottle, tray, cup, lidstock, etc. thus effectively shielding it from environmental oxygen. The eye spot can be included in the claimed container by any suitable means. For example, the eye spot can be trap printed onto one of the layers of the container, such that it is not exposed to environmental or head space oxygen, yet can be accessed for purposes of its function as an oxygen indicator. Thus, the eye spot can form part of a bottle, a tray flange, a barrier liner in a tray, a lidstock associated with a tray or cup, or a liner in or on a stand up pouch or paperboard carton.

The stripes that comprise the indicator composition(s) may be incorporated into the packaging material layer(s) by well known techniques easily adapted to the introduction of compositions comprising indicator compounds. Such techniques are described by Havens in U.S. Pat. Nos. 5,110,530 and 5,298,310. The disclosures of these two patents are incorporated herein by reference in their entirety. These patents disclose two or more preferably polymeric layers, of which at least one continuous or discontinuous layer includes a pigmented resin. The width, number, and distribution of the stripes can be varied by altering the arrangement, number, and configuration of the thin grooves or other means for controlling the flow of pigmented or dyed resin in any particular die configuration. The intensity of the striped or banded effect can also be affected by the choice of pigments, concentration of the pigment within the base or carrying resin, and thickness of the pigmented layer. The pigment can be a material invisible in ordinary light but visible in e.g. ultraviolet light. The striped film is produced by modifying conventional coextrusion dies to restrict the flow of a pigmented melt stream. In the case of multiple concentric cylinder dies, one or more of the exit annular openings is eliminated by making the two cylinders come together in a slight interference fit, in essence, sealing the channel exit. Pigmented or dyed resin is allowed to exit the channel only through very narrow grooves machined radially across the interference fit zone. In this way the exiting pigmented resin forms lanes of pigment, or stripes, between adjacent layers of resin or on the inner or outer surface of the coextruded film. By varying the relative width of the machined exit grooves and their relative spacing, different patterns of stripes may be achieved. In feed-block technology, two resin directing guides are machined to form a tight fit. Across this tight fitting lip, small grooves are machined for the exit of the pigmented resin which will form stripes. The use of a constricted exit into which thin grooves are cut for the pigmented resin to exit may be similarly applied to other die systems to achieve the same effect of stripes.

The information provided by the indicator dye, whether in the form of patches, stripes or other configuration, may be read by machine or human eye, depending upon the emitting frequency of the luminescent compound(s) used and other factors such as engineering preference.

The term "luminescent" as used herein, encompasses phosphorescence, fluorescence, or any electromagnetic emission that can serve the indicator function. When the emission frequency is in the visible spectrum, the indicator may be read by either machine or the human eye. When the emission frequency is not visible, luminescence may be detected by machine.

Luminescent compounds suitable for use in this invention include any known or after-discovered compounds having the functionality just described. Additionally, suitable luminescent compounds and compositions comprising them preferably have one or more of the following characteristics as well:

a) Their response to changes in oxygen concentration is predictable, linear, and fully reversible. Linearity is desirable for calibration and quantitative monitoring purposes. Reversibility allows the oxygen concentration to be monitored at any stage of the packaging and storage process;

b) They are sensitive to oxygen concentrations within target ranges. Ranges can include between 0% and 5% oxygen, such as between 0% and 1%, or between 0 to 1000 ppm. Combinations of indicators having different ranges and sensitivities may be used to extend such ranges if desirable;

c) They respond quickly to changes in oxygen concentration in the conditions in which they will be used. A typical response time of a luminescent compound to a change in oxygen concentration is within 1 minute or less of the atmosphere change over a temperature range of between 0° C. and 25° C.;

d) They exhibit luminescence over a range of frequencies easily monitored. For use with an inexpensive interrogative device, the indicator(s) should have suitable excitation and emission frequencies, preferably visible;

e) They are selectively responsive to oxygen concentration changes and insensitive to other gases that may permeate the dye containing packaging material, such as carbon dioxide;

f) They are stable under conditions of use and storage. Photostability is desirable but not required. Temperature stability, and stability to changes in humidity, are desirable and preferred;

g) They are clear or color-compatible with the packaging in which they are used. Color-compatibility is important for example where the indicator may form all or part of a printed image. In embodiments where a discrete patch is used, clarity or color compatibility is usually not as important;

h) They exhibit good coating and/or printability properties, and/or are amenable to extrusion; and i) The indicator is useful in relatively low concentrations in order to minimize the cost of the overall packaging material.

Preferred luminescent compounds for use in this invention include fluorescent or phosphorescent dyes that exhibit oxygen quenched luminescence. Phosphorescent dyes are preferable to fluorescent dyes for oxygen sensing as the former are characterized by well separated excitation and emission frequencies. These frequencies are commonly in the visible region of the spectrum and have relatively long excited-state lifetimes. Phosphorescent dyes also have improved sensitivity to low levels of oxygen to facilitate monitoring.

Compounds suitable as indicators in the context of this invention are known in the art. For example, Khalil et al., U.S. Pat. Nos. 4,810,655 and 5,043,286, both incorporated by reference, disclose suitable compounds and methods for their manufacture. Such compounds include metallo derivatives of octaethylporphyrin, tetraphenylporphyrin, tetrabenzoporphyrin, the chlorins, or bacteriochlorins. Other suitable compounds include palladium coproporphyrin (PdCPP), platinum and palladium octaethylporphyrin (PtOEP, PdOEP), platinum and palladium tetraphenylporphyrin (PtTPP, PdTPP), camphorquinone (CQ), and xanthene type dyes such as erythrosin B (EB). Other suitable compounds include ruthenium, osmium and iridium complexes with ligands such as 2,2'-bipyridine, 1,10-phenanthroline, 4,7-diphenyl-1,10-phenanthroline and the like. Suitable examples of these include, tris(4,7,-diphenyl-1,10-phenanthroline)ruthenium(II) perchlorate, tris(2,2'-bipyridine)ruthenium(II) perchlorate, and tris(1,10-phenanthroline)ruthenium(II) perchlorate. While the perchlorate salts are particularly useful, other counterions that do not interfere with the luminescence may be used.

Compositions comprising one or more indicator compounds will preferably be dissolved in a polymeric carrier or solvent matrix (system). There are two reasons for this. One reason is that solution achieves the maximum dispersion and therefore utilization of the indicator compound for maximum efficiency. The other is that agglomeration of the indicator compounds must be avoided because of an adverse interaction between two indicator molecules that results in self quenching and reduced efficiency. It is well known that the polymer matrix can influence the luminescence decay of the indicator (see J. Phys. Chem., 1995, 99, 3162-3167).

The indicator composition can be chosen for maximum solubility in the polymer or solvent system. One can change the solubility of a ligand indicator in a polymer or solvent matrix by varying the substituent group(s) on the ligand. For example, one can substitute non-fluorinated porphyrins for partially or fully fluorinated porphyrins, or tetraphenyl porphyrins for octaethyl porphyrins, or the like, to select the porphyrin having the solubility in a polymer or solvent matrix desired. Where the complexes involve counterions, the selection of the counterion can influence the solubility of the compound in the polymer matrix.

Those skilled in the art will understand that only a very minor amount of indicator is needed to achieve luminescence sufficient for good detection. Indicator compounds are preferably used in relatively low concentrations in order to minimize cost of the overall packaging material. Suitable concentrations of indicator compounds can be from a few micrograms per square inch (area) to a few milligrams per square inch (area).

The various embodiments of the present invention are based in part on the choices of polymer or solvent system and necessary concentrations for the indicator compound. If an indicator is sufficiently heat stable, it can be effectively blended in a polymer and extruded. One can achieve a suitable area concentration to observe luminescence by adjusting the indicator concentration and the polymer thickness. Furthermore, this indicator and polymer system can be extruded in several ways to be incorporated into a suitable rigid container. For example, the indicator can be dispersed in a monolayer film or in one or more layers of a multilayer film that also includes a barrier layer or coating. The monolayer or multilayer film can be cut to form an applique and attached to a suitable backing material.

If the indicator compound is more compatible with specific solvents, it can be incorporated into a solvent and/or ink system and effectively printed onto a suitable surface, film, or substrate. As part of a suitable ink system, the indicator compound could be trap printed along with the graphics that comprise the package label. The printed indicator can be arranged such that it becomes part of the seal area of a container. This can be useful if the indicator compound is heat sensitive or of limited solubility in a resin system. A more compatible or stronger solvent, such as tetrahydrofuran (THF) or xylene, may better dissolve the indicator compound to maximize its efficient utilization. One skilled in the art can see how to do this including the use of multiple indicator compounds and/or multiple strikes (layers) of an ink system indicator composition comprising the above described luminescent compounds. The resulting composition may be used as a quick way to determine whether oxygen concentrations are at or below threshold levels, or to measure precisely the oxygen concentration surrounding the indicator. The former can be used, for instance, as a pass-fail test to verify scavenger activation, as detection of luminescence verifies that the scavenger has consumed enough oxygen to cause oxygen concentration surrounding the indicator to fall below threshold levels. Knowing the threshold for the luminescent compound used allows one to infer the maximum oxygen concentration proximate to the scavenger when luminescence is observed. For more precise measurements, one may use combinations of different luminescent compounds simultaneously. Threshold oxygen concentrations often vary from one luminescent species to another. Selecting two or more luminescent species, each having different thresholds, allows one to track scavenging progress as the oxygen concentration passes through different levels. For easier tracking, the different species of luminescent compounds may be used within the same or different patches. Or they may occupy the same or different areas within a pre-determined portion of the packaging material, such as a grid or stripe or other pattern of indicator material. Detecting luminescence in one luminescent species, but not another, would allow one to conclude that the oxygen concentration is somewhere between each indicator's threshold levels. For even more precise measurements, the inventors contemplate straightforward adaptation of the well known Stern-Volmer methods to the present context.

In 1919, Stern and Volmer reported that oxygen quenches the luminescence of certain compounds. Since luminescence is one mode of decay from the excited state, the oxygen quenching competes with other decay modes. From their experiments, they determined what has become known as the Stern-Volmer relationship between the half-life of the excited luminescent state and the oxygen partial pressure:

$$\frac{I_{@O2=0}}{I} = 1 + \frac{P_{O2}}{P_{1/2}}$$

where:
$I_{@O2=0}$=intensity at zero oxygen concentration
$I$=measured intensity
$P_{O2}$=measured oxygen partial pressure
$P_{1/2}$=oxygen partial pressure for a half-life of the intensity This equation can be inverted and the fractions cleared to express the intensity ratio or brightness (B):

$$B = \frac{I}{I_{@O2=0}} = \frac{P_{1/2}}{P_{1/2} + P_{O2}}$$

As brightness is a ratio of two related intensive variables, it is extensive. Brightness is easily measured. From this, it is a straightforward calculation to obtain the oxygen partial pressure.

It is also possible to express the relationship on a time basis by simple substitution of the mean luminescent lifetimes, with and without oxygen present:

$$\frac{T}{T_{@O2=0}} = \frac{P_{1/2}}{P_{1/2} + P_{O2}}$$

where $T$ and $T_{@O2=0}$ are the lifetimes with and without oxygen present respectively.

In both cases, the inverse relationship between the brightness or persistence of the luminescence and the oxygen pressure can readily be seen.

For a given luminescent species, the values of $I_{@O2=0}$, $T_{@O2=0}$ and $P_{1/2}$ are often known and published. In 1987, Bacon and Demas used both intensity and lifetime measurements to demonstrate the measurement of oxygen concentration in fluid or gas using ruthenium complexes (see Anal. Chem. 1987, 59, 2780-2785). One must chose the lifetimes and intensities to suit the range of oxygen concentration to be studied.

From these equations, one can quickly see three mathematical ways to calculate the oxygen pressure from the luminescence measurement:

Method 1. Measure the luminescence intensity with oxygen present and ratio it to the luminescence without oxygen present. Equipment for this measurement technique is commonly available from several sources of optical equipment, such as Ocean Optics, Dunedin, Fla.

Method 2. Measure the luminescence lifetime with oxygen present and ratio it to the luminescence lifetime without oxygen present. There is a variation on this lifetime calculation (Abbott Laboratories), which assumes that the luminescence intensity immediately after excitation ceases is proportional to the net amount of active species where there has been no time for oxygen quenching. After a second time delay, the remaining luminescence intensity is measured again. Since the luminescence is time dependent as an exponential decay, the intensity at the second time can be related to the exponential decay curve. From this, the oxygen pressure can be calculated. Resolution of decay time curves is common in a number of technical fields. In 1991, Demas et al. published a method for utilizing a non-linear Stern-Volmer quenching response that involves fitting multiple quenching rate constants to the data (see Anal. Chem., 1991, 63, 337-342).

Method 3. Since luminescence lags the excitation, it is possible to pulse the excitation and monitor the resulting luminescence intensity and its time lag (or phase shift) to resolve the oxygen concentration. This phase shift calculation has been detailed by Colvin, et al., *Johns Hopkins APL Technical Digest*, V17, N4 (1996), pgs 377-385. In this approach, the excitation source is pulsed at a fixed frequency whose period is comparable to the lifetime of the emission.

The modulated emission is detected with a photodiode or photomultiplier and analyzed with a phase-sensitive lock-in amplifier. The phase angle θ is related to the lifetime by:

$$\tan \theta = 2\pi f \tau$$

where τ is the lifetime of the emission and f is the frequency of the modulation. Maximum phase difference occurs at $f=(1/2\pi)(\tau_1\tau_2)^{-1/2}$, where $\tau_1$ and $\tau_2$ are the lifetimes of the quenched and unquenched species. This data is used in an alternate form of the Stern-Volmer equation where:

$$\tau_0/\tau = 1 + k_{sv} p_{o2}$$

where $\tau_0$ is the luminescence lifetime in the absence of oxygen; $k_{sv}$ is the Stern-Volmer quenching constant, and $p_{o2}$ is the partial pressure of oxygen.

The oxygen indicator can comprise two or more luminescent compounds, each having different threshold levels of luminescence. The exposure of the excitation frequency can be administered in the form of a pulse.

The foregoing specification and examples are intended as exemplary only. Other embodiments of the invention will be apparent to those skilled in the art from consideration of the specification and practice of the invention disclosed herein.

The oxygen scavenger and oxygen indicator should be positioned such that they are shielded from environmental oxygen by discrete oxygen barrier layers or coatings, bearing in mind that in some cases the oxygen scavenger itself, the lateral edges of the oxygen indicator, or even the oxygen sensitive product being packaged, can function as one or both of these oxygen barrier layers or coatings.

What is claimed is:

1. A rigid container comprising:
   a) an oxygen barrier having an oxygen transmission rate of no more than 100 cc/m²/24 hr at 25° C., 0% RH, 1 atm (ASTM D 3985);
   b) an oxygen scavenger; and
   c) an oxygen indicator comprising a luminescent compound;
   wherein the oxygen indicator is substantially shielded by oxygen barrier layers from oxygen in the environment surrounding the container, and from oxygen in any headspace within the container; and
   wherein the oxygen indicator comprises all or part of a printed image.

2. The rigid container of claim 1 comprising
   a) a first layer comprising an oxygen barrier having an oxygen trans-mission rate of no more than 100 cc/m²/24 hr at 25° C., 0% RH, 1 atm (ASTM D 3985);
   b) a second layer comprising an oxygen scavenger; and
   c) a third layer comprising an oxygen indicator comprising a lumines-cent compound.

3. The rigid container of claim 1 comprising
   a) a first layer comprising an oxygen barrier having an oxygen trans-mission rate of no more than 100 cc/m²/24 hr at 25° C., 0% RH, 1 atm (ASTM D 3985);
   b) a second layer comprising an oxygen indicator comprising a lumi-nescent compound; and
   c) a third layer comprising an oxygen scavenger.

4. The rigid container of claim 1 wherein the oxygen barrier layers that substantially shield the oxygen indicator from oxygen in the envi-ronment surrounding the container, and from oxygen in any headspace within the container, are selected from the group consisting of
   i) discrete layers with a relatively low oxygen transmission rate, and
   ii) adhesive or other layers which allow limited ingress of oxygen, but at a rate that allows the indicator to be monitored for an indication of the presence or absence of oxygen dissolved in the solid material carrying the oxygen scavenger, without significant influence from atmospheric effects.

* * * * *